United States Patent

Noddin

[11] 4,244,718
[45] Jan. 13, 1981

[54] REVERSE GAS-FLOW BAG FILTER

[75] Inventor: Emerson L. Noddin, Auburn, Me.

[73] Assignee: Albany International Corp., Albany, N.Y.

[21] Appl. No.: 677,402

[22] Filed: Apr. 15, 1976

[51] Int. Cl.³ .............................................. B01D 46/02
[52] U.S. Cl. ........................................ 55/377; 55/378
[58] Field of Search .................... 55/379, 376–378, 55/374; 277/230, 183–186, 235 R

[56] References Cited

U.S. PATENT DOCUMENTS

| | | | |
|---|---|---|---|
| 2,299,623 | 10/1942 | Harper | 55/377 X |
| 2,308,309 | 1/1943 | Ruemelin et al. | 55/377 |
| 2,769,506 | 11/1956 | Abboud | 55/379 X |
| 2,858,150 | 10/1958 | Neher et al. | 277/183 |
| 2,927,659 | 3/1960 | Pabst et al. | 55/377 X |
| 2,976,953 | 3/1961 | Haas et al. | 55/379 X |
| 3,321,892 | 5/1967 | Saint-Jacques | 55/378 X |
| 3,410,061 | 11/1968 | Knight | 55/378 |
| 3,458,207 | 7/1969 | Conti | 277/235 R X |
| 3,481,824 | 12/1969 | Poltorak | 277/230 X |
| 3,554,567 | 1/1971 | Carroll et al. | 277/235 R X |
| 3,765,152 | 10/1973 | Pausch | 55/379 X |
| 3,871,845 | 3/1975 | Clark et al. | 55/378 X |
| 3,898,067 | 8/1975 | Genton | 55/378 X |
| 3,937,621 | 2/1976 | Gravley | 55/377 |
| 4,007,026 | 2/1977 | Groh | 55/378 X |
| 4,015,961 | 4/1977 | Howard et al. | 55/378 |

FOREIGN PATENT DOCUMENTS

| | | | |
|---|---|---|---|
| 966235 | 8/1964 | United Kingdom | 55/378 |
| 1201841 | 8/1970 | United Kingdom | 55/378 |

Primary Examiner—Kathleen J. Prunner

[57] ABSTRACT

A bag filter having a self-sealing cuff at the upper open end thereof, a bottom support at the closed end to tension the bag and prevent flapping and a plurality of spaced anticollapse rings each of which encircles an annular outer surface of the bag to which it is attached between the ends of the bag to prevent bag collapse.

5 Claims, 8 Drawing Figures

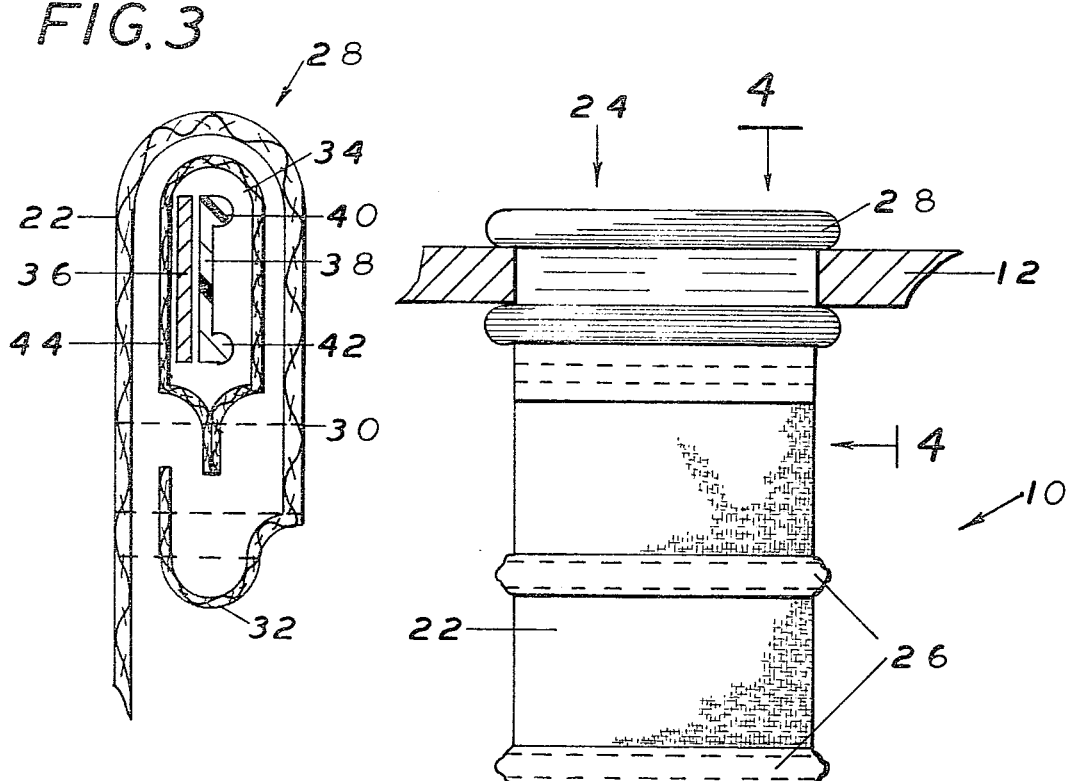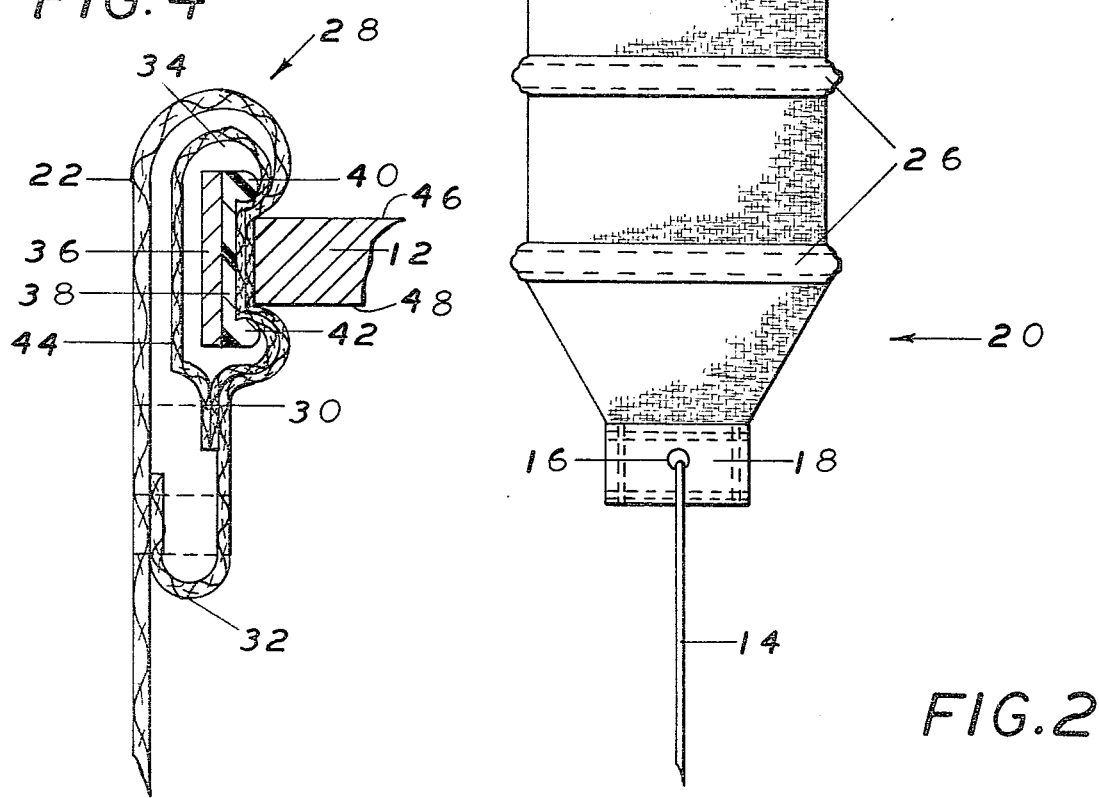

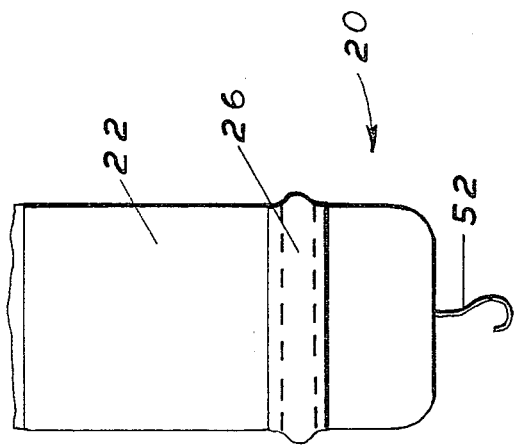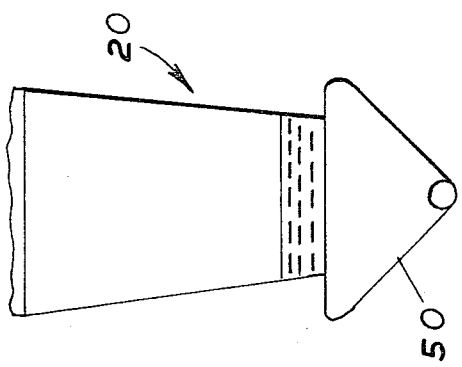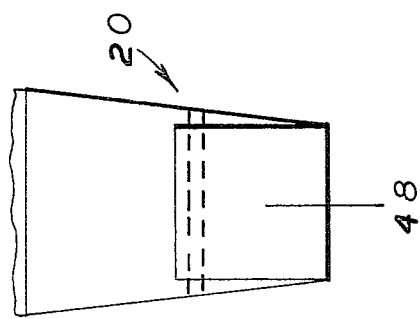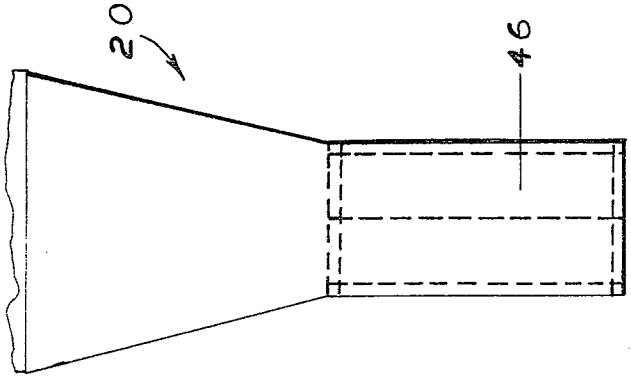

REVERSE GAS-FLOW BAG FILTER

BACKGROUND OF THE INVENTION

1. Field of the Invention

The invention relates to gas filters and more particularly relates to reverse gas-flow bag filters for removing solids entrained in a gas, of the type adapted to be mounted in the aperture of a dividing plate so that a gas on one side of the dividing plate is caused to flow into the bag and out at the other side of the dividing plate.

2. Brief Description of the Prior Art

Reverse gas-flow bag filters are described in British Pat. No. 887,772 (published Jan. 24, 1962) together with a complete disclosure of their installation and use in a bag filter housing. In general, this type of bag filter has the structure illustrated in the accompanying drawing of FIG. 1. As shown in FIG. 1, the reverse gas-flow filter comprises a tube 3 fabricated from a filter fabric and having a closed end 4 and an open end 5. The tube 3 is supported by a tubular frame 6 comprising vertical struts 7 tied together and inserted into tube 3 through the open end 5. The tube 3 with its supporting frame 6, is mounted in an aperture of a dividing plate 8 which is a component of a conventional bag filter housing, sometimes commonly referred to as a "bag house". The space between the tube 3 and dividing plate 8 is filled with a gasket material 9 to form an air-tight seal between tube 3 and dividing plate 8. The mounting of tube 3 and the support frame 6 is generally effected by threading the collar of frame 6 and securing it with a large nut (not shown) to the dividing plate 8. In operation, a gas contaminated with solids is directed into the bag house, housing generally a plurality of filter bags mounted on the dividing plate. The contaminated gas passes through the filter, whereupon the solids are left on the outside surface of the bag filter. The filtered gas passes from the filter through the open end 5 for release on the outside of the dividing plate 8. After a period of time, solids build up on the outside of tube 3 and reduce the flow of gas therethrough. To correct this, periodically the flow of gas is reversed to flex the tube walls and cause the built up solids (commonly referred to as a "dust cake") to fall off the filter.

The prior art reverse gas-flow filter bags known heretofore have not been entirely satisfactory for a number of reasons. For example, the requirement for a support frame to support the tubular wall of the fabric bag is costly in terms of the added cost in their initial provision and in terms of their increasing the wear and tear on the fabric bag. More specifically, continued and periodic flexing of the tube or bag wall during reverse gas-flow cycles abrades the fabric where it contacts the supporting frame. This abrasion problem is of such magnitude that heretofore it has been impractical to use the highly abrasion prone glass fabrics for fabrication of reverse gas-flow bag filters. Of course the use of glass fabric bags would be highly desirable and advantageous where the gas to be filtered is maintained at a high temperature, restricting the use of other filter fabrics.

The prior art filter bags have also required relatively costly and complex hardware arrangements for securing to the dividing plate of the bag house. A gas-tight seal with the plate is required. This generally requires separate sealing components and fasteners. In addition, those skilled in the art readily appreciate the manpower requirements for installing, removing and replacing the prior art bag filters with their associated mounting hardware.

The improved reverse gas-flow filter bags of my invention are simple to construct, unitary, do not require a separate support frame upon which the inner surface of the bag can abrade, are quickly installed or removed without special tools and are self-sealing with the dividing plate of the bag housing.

British Pat. No. 1,206,544 discloses a reverse gas-flow bag filter supported by external "stiffening rings".

SUMMARY OF THE INVENTION

The invention comprises, a reverse gas-flow type of bag filter for removing solids entrained in a gas, which comprises;

a tube having an open end, a closed end and wall joining said ends, said tube being fabricated from a gas-permeable filter fabric for filtering solids from a gas;

a wall support member disposed between said open and closed ends, attached to a portion of the wall of said tube;

means for connecting said closed end to a means for tensioning said tube along its lengthwise axis, said connecting means being associated with said closed end; and a collar associated with said open end for sealingly mounting said tube in the filter bag aperture of a dividing plate of a bag filter housing, said collar comprising,
 (a) a cuff formed by folding the wall of said tube adjacent said open end, in the direction of said closed end; and
 (b) a gas sealing member within said cuff, said sealing member including a first sealing surface for engaging the inner surface of said dividing plate and a second sealing surface for engaging the outer surface of said dividing plate.

BRIEF DESCRIPTION OF THE DRAWINGS

FIG. 2 is an isometric view of an embodiment of the invention shown mounted on the dividing plate of a bag filter housing.

FIG. 3 is a cross-sectional view of an embodiment collar component of the filter bag of the invention showing its components in separated positions.

FIG. 4 is a cross-sectional view along lines 4—4 of FIG. 2.

FIGS. 5-8, inclusive, are isometric views-in-part of alternate embodiment closed ends for filter bags of the invention.

DETAILED DESCRIPTION OF THE PREFERRED EMBODIMENTS OF THE INVENTION

Figure 1:
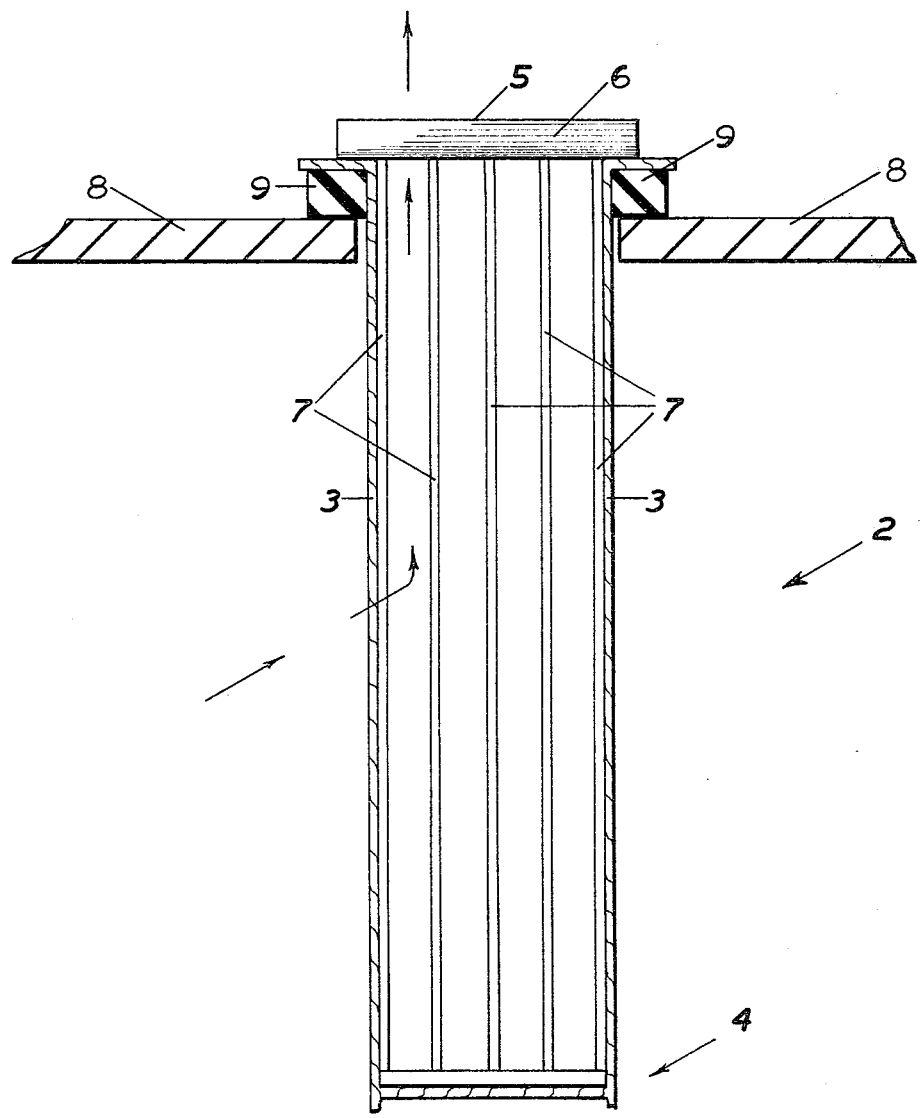
FIG. 1 is a cross-sectional view-in-part of a prior art bag filter.

For convenience in appreciating the invention, the following description of the invention should be read in conjunction with the accompanying drawings of FIGS. 1-8, inclusive. Referring first to FIG. 2, an isometric view of an embodiment bag filter 10 of the invention is seen mounted in the dividing plate 12 of a bag filter housing. The bag 10 is tensioned along its lengthwise axis by attachment to the floor of the baghouse (not shown in the drawing) through cable 14. Cable 14 is secured to bag 10 through eyelet 16 piercing the tab 18 formed by stitching the end 20 of bag 10 closed. The bag 10 is fabricated from any conventionally employed filter fabric conventionally used to filter solids entrained in a gas. Thus, for example, wall 22 of bag 10 may comprise textile fabrics such as nylon, acrylic, acrylic-vinyl copolymers, polyethylene, polypropylene, polytetrafluoroethylene, glass fiber and the like. The filter bags of the invention are particularly advantageous for fabrication from glass fiber fabrics.

The bag 10 has a tubular body closed at end 20 and open at end 24. The bag 10 more particularly has a tubular body round in cross-section and supported from collapse by a plurality of rings or support members 26 attached to wall 22 and encircling the outer periphery thereof. The members 26 are disposed between ends 20,24. The bag 10 is mounted in the filter bag aperture of the dividing plate 12 and embraces plate 12 as shown in FIG. 4 in such a manner that the joinder between bag 10 and plate 12 is gas-impermeable.

Referring now to FIG. 3, a cross-sectional view-in-part of an embodiment collar 28, further details of this component may be observed. For clarity, the components of collar 28 are shown slightly separated and not in their true positions. The wall 22 at the open end 24 of bag 10 is folded, preferably outwardly, towards the closed end 20 to form a cuff 30. The top of cuff 30 is folded again to form tab 32 for strength, the cuff 30 being stitched to wall 22 as shown by the transverse, broken lines. Enclosed by cuff 30 is a sealing member 34 which comprises a support 36 which may be any hard surfaced, planar structure such as a metallic band. Positioned on the outer surface of support 36 is gasket 38 which may be any gas sealing material such as a synthetic or natural polymeric resin elastomer; for example rubber, non-cellular polyurethane elastomer, and the like. The upper end of gasket 38 has associated therewith a bead 40 and the lower end of gasket 38 has associated therewith a bead 42. Beads 40,42 may be fabricated from the same or different materials as gasket 38. In a preferred embodiment, beads 40,42 are integrally molded parts of gasket 38. As shown in FIG. 3, support 36, gasket 38 and beads 40,42 are disposed within fabric pouch 44. Pouch 44 protects the enclosed components and supplies bulk to the collar 28. Pouch 44 is advantageously fabricated from the same fabric used for wall 22.

Referring now to FIG. 4, a cross-sectional view along lines 4—4 of FIG. 2, it is noted that the cuff material is sandwiched between the gasket and plate 12 thereby avoiding the passage of gas between bag and plate 12. As set forth above, the collar 28 comprises a cuff 30 formed by folding a portion of wall 22 at end 24 toward the closed end 20 and stitching the cuff to wall 22. For added strength the end or tab 32 at the top of the cuff is folded under the stitch line. Supporting the gasket 38 is preferred and a metallic band 36 is positioned within pouch 44 to support gasket 38 against plate 12. Any other supportive material such as a non-cellular plastic or the like may also be used. The band 36 may be bonded to gasket 38 if desired to assure maintenance of its position. The pouch 44 supplies bulk to the collar 28 to assure a good seal with plate 12 and also aids in maintaining positional integrity of sealing member 34 and its component parts.

Those skilled in the art will appreciate the convenience offered by bag 10 in respect to its ease of installation or removal from mounting in the aperture of a dividing plate 12. By proper selection of size, bag 10 will have a diameter between beads 40 and 42 slightly larger than the diameter of the aperture. Since the beads 40 and 42 are elastic, bag 10 is readily pressed into place as shown in FIG. 4, to take advantage of the self-sealing attributes of the bag 10. Nuts, threaded collars, etc. are not required to secure bag 10 in place on plate 12, the frictional fit of the collar 28 and the flange effects of beads 40,42 being sufficient to secure the attachment of bag 10.

Those skilled in the art will appreciate that many modifications may be made to the embodiment bag 10 of the invention without departing from the spirit of the invention. For example, tab 18 and eyelet 16 are just one means of attaching the closed end 20 to a means for tensioning bag 10 along the lengthwise axis. As shown in FIGS. 5–8, alternate means of connecting closed end 20 comprise the employment of a tie-down strap 46 (FIG. 5), a loop 48 (see FIG. 6) that may be secured to an "L" shaped rod, a hanger 50 (see FIG. 7) which may connect with a "J" hook or a hook 52 (FIG. 8) which facilitates connecting with a "J" hook or an eyelet.

Those skilled in the art will also appreciate that in the bag of the invention, the collar 28 is unitary and does not require attachment to a stiff collar or thimble of dissimilar material. This provides a long wearing collar.

What is claimed:

1. In a bag filter to be received in the opening in a dividing plate of a bag filter housing and supported thereby, said bag including a peripheral wall and open and closed upper and lower ends respectively, said wall of said bag folded upon itself at the open end thereof and fastened thereto to provide a cuff, an elastomeric gasket within said cuff, said gasket including spaced outwardly projecting beads adapted to urge said cuff in sealing engagement with the upper and lower surfaces of said dividing plate, means for connecting said lower end to said bag housing for tensioning said bag along its lengthwise axis, a hard surfaced support structure within said cuff adjacent said gasket, and a plurality of transversely extending wall support members attached to said bag in spaced relationship whereby said wall is prevented from inward or outward collapse.

2. A bag filter in accordance with claim 1 in which said support structure and said gasket are disposed within a fabric pouch within said cuff.

3. A bag filter in accordance with claim 1 in which said bag is formed of fibreglass.

4. A bag filter in accordance with claim 1 in which each of said wall support members is a ring encircling an annular outer surface of said bag and attached thereto.

5. A bag filter in accordance with claim 1 in which the means for connecting said lower end to said bag housing includes a tab formed by stitching the end of said bag closed.

* * * * *